June 11, 1963     M. M. ROSENFELD     3,093,054

GENERATOR DEVICE FOR BOMBSHELTERS

Filed Sept. 5, 1961

INVENTOR.
MORTON M. ROSENFELD
BY
Arthur H. Seidel
ATTORNEY

United States Patent Office 3,093,054
Patented June 11, 1963

3,093,054
GENERATOR DEVICE FOR BOMBSHELTERS
Morton M. Rosenfeld, 271 Madison Ave.,
Mount Vernon, N.Y.
Filed Sept. 5, 1961, Ser. No. 135,900
1 Claim. (Cl. 98—1)

This invention relates to a generator device for bombshelters. More particularly, the present invention is directed to a manually operable device for generating current for recharging batteries while simultaneously providing energy in the form of a rotating shaft for operating a blower fan in a ventilation system for a bombshelter or the like.

Numerous items such as radios, lights, cooking utensils, etc. adapted for use in a bombshelter require a source of electricity. As a general rule, a battery will supply the electricity needed to operate such devices. Recently divulged information indicates that it may be necessary to remain in a bombshelter for periods of thirty days or more. Accordingly, some means must be provided to recharge the batteries. In addition, it is desirable to provide a mechanical means for use in a forced air circulation system for the bombshelter.

The generator device of the present invention is in the nature of a bicycle. The blades of a blower for the circulation of air in the ventilation system, the rotor of a generator, and the rear sprocket on the bicycle are mounted on the same shaft. Accordingly, as the bicycle is pedaled electricity is generated for recharging a battery and for rotating the blades of the blower in the ventilation system. Since the bicycle is manually operated, the same provides a means for enabling persons within the bombshelter to obtain exercise for health purposes. Thus, persons disposed within a bombshelter for periods of thirty days or more require some means for exercising their muscles.

It is an object of the present invention to provide a novel generator device for use in bombshelters or the like.

It is another object of the present invention to provide a manually operable device for generating electricity.

It is still another object of the present invention to provide a novel device for generating electricity and supplying the motive power required to operate a blower fan in a ventilation system.

Other objects will appear hereinafter.

For the purpose of illustrating the invention there is shown in the drawings a form which is presently preferred; it being understood, however, that this invention is not limited to the precise arrangements and instrumentalities shown.

Figure 1:
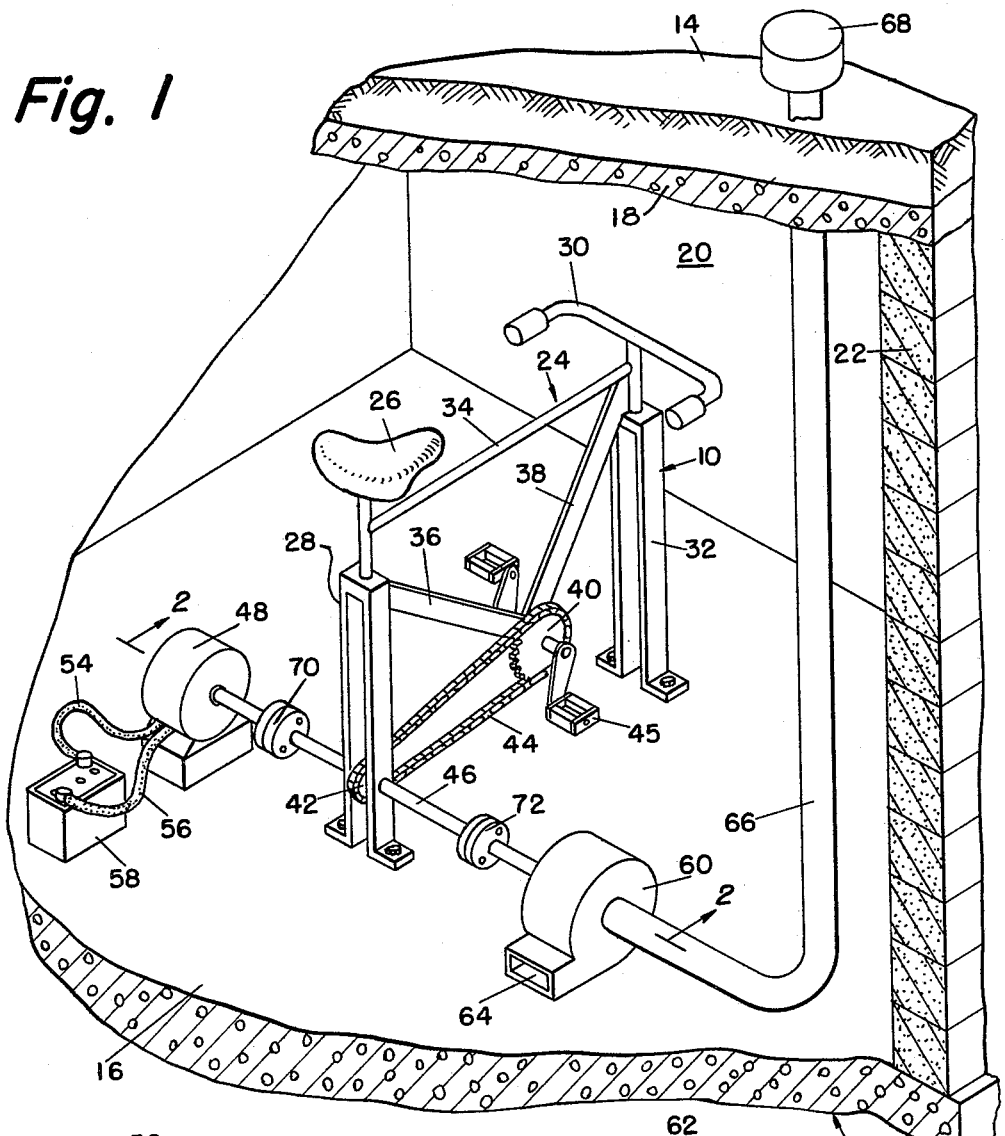
FIGURE 1 is a partial perspective view of a bombshelter disposed underground with portions broken away for purposes of illustration.

Referring to the drawing in detail, wherein like numerals indicate like elements, there is shown in FIGURE 1 a perspective view of a manually operable device designated generally as 10. The device 10 generates electricity for operating an external device or charging a battery and simultaneously provides the energy necessary to rotate the blower in a ventilation system.

The generator device 10 is illustrated in FIGURE 1 as being disposed within a bombshelter designated generally as 12. The bombshelter 12 is disposed below the ground level 14. The bombshelter 12 is provided with a floor 16, a ceiling 18, and walls such as walls 20 and 22 all made from concrete. Other features of the bombshelter 12 such as doorways, sleeping quarters, etc. are not illustrated, since the same form no part of the present invention.

The generator device 10 includes a simulated bicycle designated generally as 24. The bicycle 24 includes a seat 26 adjustably supported on a bifurcated rear strut 28. A handlebar 30 is supported on a front strut 32. A crossbar extends between and has its ends secured to the struts 28 and 32. An intermediate strut 36 has one end secured to the strut 28 and a bifurcation at its other ends. An intermediate strut 38 has one end secured to the strut 32 and a bifurcation at its other end.

The bifurcated ends of the struts 36 and 38 rotatably support a sprocket 40. A sprocket 42 is rotatably supported between the bifurcations on the rear strut 28. A flexible member such as chain 44 extends around the sprockets 40 and 42. Panels 45 are provided for the sprocket 40 so that a person sitting on the seat 26 may utilize his feet to rotate the sprocket 40. It will be noted that the struts 28 and 32 are supported on the floor 16 of the bombshelter 12. The struts 28 and 32 are preferably provided with flanges at their lowermost ends which are bolted to the floor 16.

The sprocket 42 is rotatably mounted between the bifurcations on the strut 28 by means of a shaft 46. The sprocket 42 is keyed to the shaft 46. The shaft 46 is of sufficient length so that it extends through a generator 48 supported on one side of the sprocket 42. The generator 48, per se, is of a known type which is commercially available. A rotor 50 of the generator 48 is secured to the shaft 46. The periphery of the rotor 50 is provided with a plurality of grooves within which are disposed the coil winding. A plurality of poles 52 are provided at spaced points around the inner periphery of the housing of the generator 48 so that such poles are juxtaposed to the coil winding on the rotor 50.

Wires 54 and 56 extend from the brushes (not shown) to the terminals of a device such as battery 58. When the wires 54 and 56 are connected to the battery 58, the generated electricity may be utilized to recharge the battery 58. It will be appreciated that the wires 54 and 56 may be connected to other devices. If such other devices operate on alternating current, conventional means such as a rectifier may be provided in the wires 54 and 56.

The shaft 46 is also of sufficient length so as to extend through the housing of a blower 60 on the opposite side of the sprocket 42 from the generator 48. A plurality of blades 62 are secured around the periphery of the portion of the shaft 46 which is disposed within the housing of the blower 60.

The housing of the blower 60 is provided with an outlet 64. The inlet to the housing of the blower 60 is connected to a ventilation pipe 66 which extends through the ceiling 18 to a point above ground level 14. The uppermost end of the pipe 66 is provided with an inverted cup-shaped cap 68. A conventional filter device may be provided within the cap 68. The cap 68 prevents foreign matter and rain water from entering the pipe 66.

It is believed that the operation of the present invention is obvious from the above description. When it is desired to generate only electricity, the blower 60 may be disconnected by unlatching the coupling 62. Thereafter, the person may sit on the seat 26 and manipulate the pedals 45 with his feet. The rotary motion of the sprocket 40 is transmitted to the sprocket 42 by the chain 44. Since the sprocket 42 is keyed to the shaft 46, the rotor 50 will be rotated within the generator 48 thereby generating electricity in a known manner.

When it is desired only to operate the blower 60, the generator 48 is disconnected by unlatching the coupling 70. Thereafter, the person manipulates the pedals 45 as set forth above thereby rotating the blades 62 in the blower 60. In this manner, fresh air may be sucked into the bombshelter 12 through the pipe 66.

Figure 2:
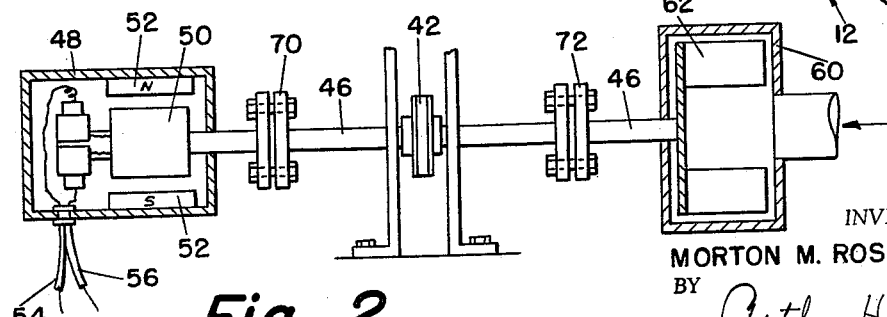
FIGURE 2 is a sectional view taken along lines 2—2 of FIGURE 1.

If it is desired to generate electricity and operate the blower of the ventilation system, the elements remain connected as illustrated in FIGURES 1 and 2. Thus, manipulation of the pedals 45 may generate electricity to charge the battery 58 while simultaneously rotating the blades 62 of the blower 60. Since persons may be forced to remain within the bombshelter 12 for many weeks, the device 10 of the present invention may be utilized as a source of amusement and/or exercise. While the blower 60 is illustrated as being connected to an inlet pipe in the ventilation system, it will be appreciated that the blower 60 may alternatively be connected to the outlet pipe. In this case, element 64 will be an inlet to the blower 60 and pipe 66 will be an outlet pipe.

While a simulated bicycle type means for driving the ventilation system and generator is illustrated, it is to be understood that manually operated means may be utilized, although the simulated bicycle type means are to be preferred.

The present invention may be embodied in other specific forms without departing from the spirit or essential attributes thereof and, accordingly, reference should be made to the appended claim, rather than to the foregoing specification as indicating the scope of the invention.

I claim:

Apparatus comprising large and small rotatably mounted sprockets, a chain for mechanically interconnecting said sprockets, a set of pedals for driving said large sprocket, a first bifurcated support for said small sprocket, said first support having spaced parallel upright legs joined at their upper ends by a first cross piece, the lowermost ends of said legs having integral outwardly extending flanges thereon, said flanges being adapted to be bolted to the floor of a bomb shelter, a main drive shaft, said main drive shaft passing through both of said first support legs, said small sprocket being mounted on said main drive shaft between said legs, a seat supported by said first support above said first support cross piece, said seat being in a plane higher than said pedals, a second bifurcated support, said second support having spaced parallel upright legs joined at their upper ends by a cross piece, said second support upright legs having outwardly directed flanges at the bottom thereof for mounting said second support on the floor of a bomb shelter spaced from said first support, handle bars mounted on said second support cross piece in the same plane as said seat, a third support for supporting said large sprocket between said first and second supports, a blower, said blower being mounted on a blower shaft, a bolted flange coupling connecting said blower shaft with one end of said main drive shaft, an electric generator, a generator drive shaft for rotating said generator to generate electricity, a second bolted flange coupling connecting said generator drive shaft to the other end of said main drive shaft, a battery connected to said generator to be charged thereby, and ventilation conduits for the bomb shelter connected to said blower for ventilating the bomb shelter.

References Cited in the file of this patent

FOREIGN PATENTS

| | | |
|---|---|---|
| 477,350 | Great Britain | Dec. 28, 1937 |
| 484,854 | Great Britain | May 11, 1938 |